Sept. 5, 1939.  H. KANN  2,172,204

ELECTRICAL BRAKING SYSTEM

Filed Nov. 16, 1938

WITNESSES:

INVENTOR
Heinrich Kann.
BY
ATTORNEY

Patented Sept. 5, 1939

2,172,204

UNITED STATES PATENT OFFICE 2,172,204

ELECTRICAL BRAKING SYSTEM

Heinrich Kann, Berlin-Charlottenburg, Germany, assignor to Westinghouse Electric & Manufacturing Company, East Pittsburgh, Pa., a corporation of Pennsylvania Application November 16, 1938, Serial No. 240,727
In Germany November 18, 1937

6 Claims. (Cl. 172—179)

The invention relates generally to electrical braking systems, and more particularly to a regenerative braking circuit for alternating-current vehicles in which the excitation of the motors during the regenerative braking operation is accomplished with alternating-current as, for example, from a transformer connected to the power network.

The principal object of the invention is to provide a regenerative braking system which operates with as high a power factor as possible.

Another object of the invention is to provide for regulating the braking effect during regenerative braking operation.

Other objects of the invention will be explained fully hereinafter or will be apparent to those skilled in the art.

In accordance with the invention, the regenerative braking effect is obtained by causing the motor or motors which are connected in the braking circuit to operate on two branches connected to the power transformer, of which one branch contains a reactor and the other a capacitor. This circuit makes possible the practical attainment of a power factor of unity over a wide rational speed range for regenerative braking operation.

For a fuller understanding of the nature and objects of the invention, reference may be had to the following detailed description, taken in conjunction with the accompanying drawing in which.

Figure 1:
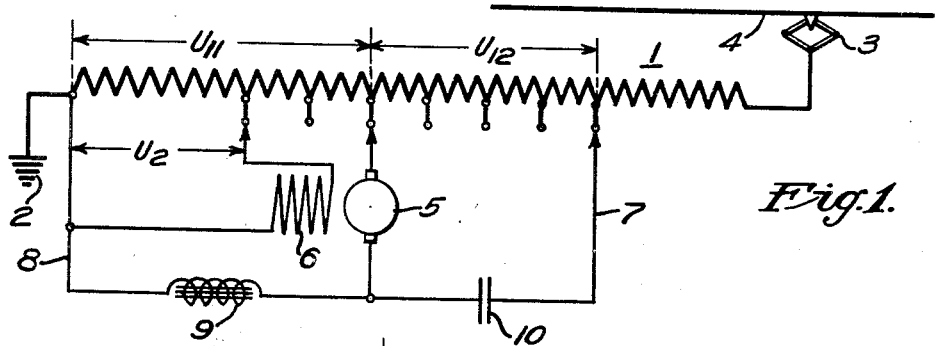
Figure 1 is a diagrammatic view of a regenerative braking system embodying the present invention.

Referring to Fig. 1 of the drawing, the reference character 1 designates a locomotive transformer arranged to operate as an autotransformer, one of the winding ends of which is grounded at 2 and the other winding end is connected to a trolley wire 4 through a pantograph 3 for regenerative braking. An alternating-current series motor 5, having a field winding 6 for exciting the motor, is connected to the transformer 1. The field winding 6 is connected to the taps of the transformer winding independently of the armature circuit so that the machine operates practically with constant excitation independently of the armature current.

The exciting potential applied to the field winding 6 is identified by $U_2$. The armature 5 of the motor is connected in two braking circuits 7 and 8 of which one is subjected to the potential $U_{11}$ and the other to the potential $U_{12}$ of the transformer 1. A reactor 9 is connected in the circuit 8 and a condenser 10 is connected in the circuit 7. The reactor 9 and condenser 10 are so designed that their wattless impedances are practically equal.

Figure 3:
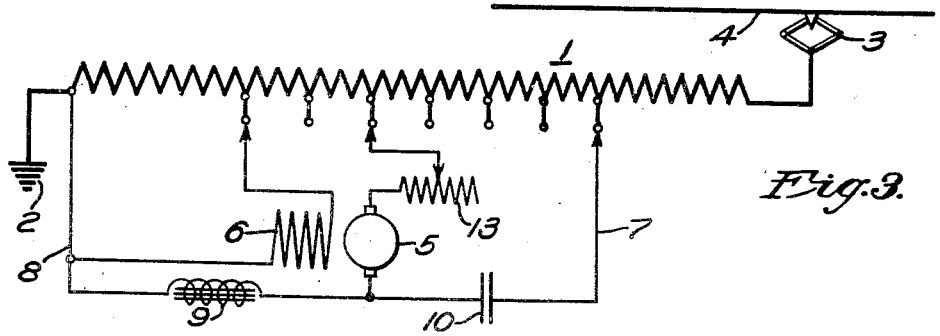
Figs. 3 and 4 are diagrammatic views of modifications of the system shown in Fig. 1.
Figure 4:
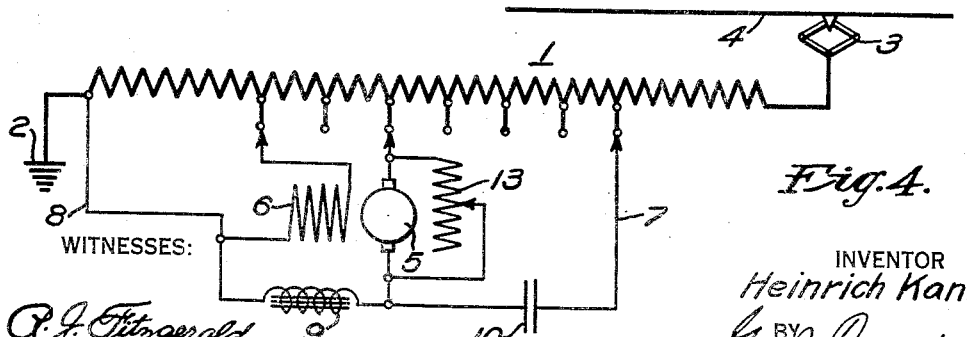

In order to obtain a regulation of the braking effect, the two circuits 7 and 8 may be connected to different taps of the transformer winding by switching means well known in the art. A braking regulation is also possible by varying the excitation of the field winding 6 or by the utilization of an impedance or resistance 13 in the motor circuit, as shown in Fig. 3, or by connecting the variable resistance 13 in parallel circuit relation to the armature of the motor, as shown in Fig. 4.

Figure 2:
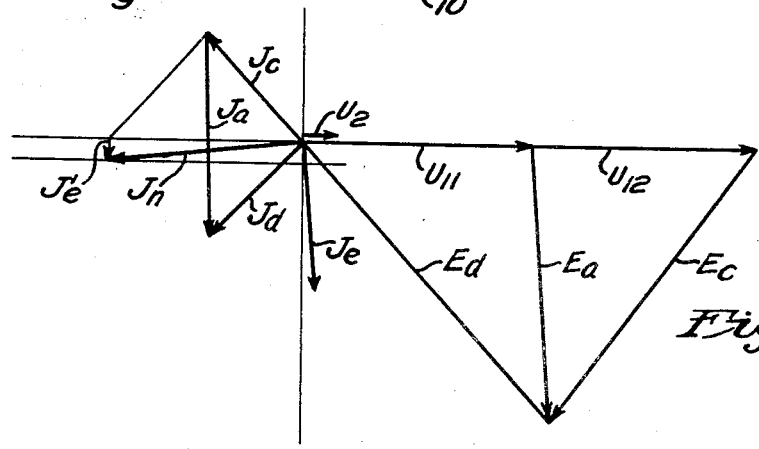
Fig. 2 is a vector diagram of the circuit shown in Fig. 1.

As explained hereinbefore, Fig. 2 of the drawing shows a vector diagram which may be attained with the circuit illustrated in Fig. 1. In this diagram, $U_{11}$ and $U_{12}$ signify the tapped potentials of the transformer to which the braking circuits 7 and 8 are connected. The potential on the armature 5 is designated by $E_a$. The potentials which are impressed on the reactor 9 and the condenser 10 are designated by $E_d$ and $E_c$, respectively. The armature potential $E_a$ combines with the reactor potential $E_d$ and the condenser potential $E_c$ in such manner that the potentials $U_{11}$ and $U_{12}$, respectively, result. In the current diagram $J_c$ signifies the current passing through the condenser circuit 7, and $J_d$, the current passing through the reactor circuit 8. The armature current $J_a$ of the armature 5 results from the difference of the currents $J_c$ and $J_d$. It will be seen that the armature current $J_a$ has practically the same phase position as the armature potential $E_a$ which results in unity power factor operation of the machine. As shown, the sum of the two currents $J_c$ and $J_d$ equals the current $J_n$ which is supplied back to the power network during regenerative braking.

In addition to the foregoing vectors, $J_e$ identifies the current vector for the exciting current which passes through the circuit of the field winding 6. The vector $$J'_e = J_e \cdot \frac{U_2}{U_{11}}$$

From the foregoing description, it is apparent that I have provided a regenerative braking system which operates at practically unity power factor and in which the braking effect may be regulated as desired.

I do not desire to be restricted to the particular form or arrangement of parts herein shown and described, since it is evident that they may be modified without departing from the spirit and scope of the invention as defined in the appended claims.

I claim as my invention:

1. A regenerative braking circuit comprising a transformer, a power conductor connected to the transformer, and an alternating-current motor having an armature winding and a field winding, the field winding being connected to the transformer for shunt excitation of the motor, said armature being connected to the transformer in two braking circuits, of which one contains a reactor and the other a capacitor.

2. A regenerative braking circuit comprising a transformer, a power conductor connected to the transformer, and an alternating-current motor having an armature winding and a field winding, the field winding being connected to the transformer for shunt excitation of the motor, said armature being connected to the transformer in two braking circuits, of which one contains a reactor and the other a capacitor, said capacitor and reactor being so designed that their wattless impedances are practically equal.

3. A regenerative braking circuit comprising a transformer, a power conductor connected to the transformer, and an alternating-current motor having an armature winding and a field winding, the field winding being connected to the transformer for shunt excitation of the motor, said armature being connected to the transformer in two braking circuits, of which one contains a reactor and the other a capacitor, and means for varying the excitation of the motor to regulate the braking effect.

4. A regenerative braking circuit comprising a transformer, a power conductor connected to the transformer, and an alternating-current motor having an armature winding and a field winding, the field winding being connected to the transformer for shunt excitation of the motor, said armature being connected to the transformer in two braking circuits, of which one contains a reactor and the other a capacitor, and means for connecting the braking circuit to different taps on the transformer to regulate the braking effect.

5. A regenerative braking circuit comprising a transformer, a power conductor connected to the transformer, and an alternating-current motor having an armature winding and a field winding, the field winding being connected to the transformer for shunt excitation of the motor, said armature being connected to the transformer in two braking circuits, of which one contains a reactor and the other a capacitor, and a resistance connected in the motor circuit to regulate the braking effect.

6. A regenerative braking circuit comprising a transformer, a power conductor connected to the transformer, and an alternating-current motor having an armature winding and a field winding, the field winding being connected to the transformer for shunt excitation of the motor, said armature being connected to the transformer in two braking circuits, of which one contains a reactor and the other a capacitor, and a variable resistance connected in parallel-circuit relation to the armature of the motor to regulate the braking effect.

HEINRICH KANN.